United States Patent
Blinn et al.

(10) Patent No.: US 7,461,090 B2
(45) Date of Patent: Dec. 2, 2008

(54) SYSTEM AND METHOD FOR SELECTION OF MEDIA ITEMS

(75) Inventors: Arnold N. Blinn, Bellevue, WA (US); Jerry Koh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 474 days.

(21) Appl. No.: 10/835,309

(22) Filed: Apr. 30, 2004

(65) Prior Publication Data

US 2005/0246374 A1    Nov. 3, 2005

(51) Int. Cl.
*G06F 7/00* (2006.01)

(52) U.S. Cl. ............................ 707/104.1; 707/4; 707/2; 707/3; 707/6; 715/500.1

(58) Field of Classification Search ................. 707/2–4, 707/104.1; 715/500.1
See application file for complete search history.

(56) References Cited

U.S. PATENT DOCUMENTS

| | | | |
|---|---|---|---|
| 6,654,742 B1 * | 11/2003 | Kobayashi et al. ............. 707/7 |
| 6,697,800 B1 * | 2/2004 | Jannink et al. ................. 707/5 |
| 6,865,600 B1 * | 3/2005 | Brydon et al. ............... 709/219 |
| 2003/0003433 A1 * | 1/2003 | Carpenter et al. ........... 434/323 |
| 2003/0182157 A1 * | 9/2003 | Valk ............................. 705/1 |
| 2004/0019658 A1 * | 1/2004 | Plastina et al. ............. 709/217 |
| 2004/0083273 A1 * | 4/2004 | Madison et al. ............. 709/217 |
| 2004/0199529 A1 * | 10/2004 | Clark et al. ................. 707/100 |
| 2005/0015389 A1 * | 1/2005 | Novak et al. ................. 707/100 |
| 2005/0091271 A1 * | 4/2005 | Srinivas et al. ........... 707/104.1 |
| 2005/0131731 A1 * | 6/2005 | Brydon et al. ................. 705/1 |

* cited by examiner

*Primary Examiner*—Don Wong
*Assistant Examiner*—Binh V Ho
(74) *Attorney, Agent, or Firm*—Shook, Hardy & Bacon L.L.P.

(57) ABSTRACT

A method and system are provided for use in a computing environment for selecting and arranging media items as output. The media items may include photographs, videos, musical selections, or other types of media items. Selection components select multiple media items for output. A source selection component selects media items from at least one source. A query component searches media items from the selected source based on tagged metadata in accordance with a user selection. Weighting tools may be applied to cause a first set of selected media items to be selected with a first frequency and a second set of selected media items to be selected with a second frequency. A sorting component may organize the output in a user-selected order.

12 Claims, 5 Drawing Sheets

MEDIA ITEM LIST 300

OUTPUT SELECTION COMPONENTS 310

- SOURCE SELECTION MODULE 312
- WEIGHTING TOOLS 316
- QUERY MODULE 314
- COUNTING MODULE 318

OUTPUT SORTING COMPONENTS 320

- RANDOM 322
- IDENTIFYING DATA 324
- DIRECTIONAL 326

LIST ITEMS 330

| EMBEDDED LISTS 330 | MEDIA ITEMS 340 |

FIG. 3

SYSTEM AND METHOD FOR SELECTION OF MEDIA ITEMS

CROSS-REFERENCE TO RELATED APPLICATIONS

None

STATEMENT REGARDING FEDERALLY SPONSORED RESEARCH OR DEVELOPMENT

None.

TECHNICAL FIELD

Embodiments of the present invention relate to selection and presentation of media items to users. More particularly, embodiments of the invention relate to a technique for selective presentation appropriate for multiple situations.

BACKGROUND OF THE INVENTION

In current media environments, there is not a great deal of flexibility if a user plans to output a series of media items such as photographs, videos, or musical selections. Typical state of the art allows the user to specify a complete directory of media items, multiple directories, a specific media item, or a network share of media items (e.g. a web site collection such as an MSN Group). These techniques for grouping and selecting media items are very limited in scope.

The use of media items in computerized environments has become increasingly common. Computer users often have thousands of digital images or music files archived on their hard disks. Many computer users now use photo or music organizational products to categorize and organize their photographs or music. These organizational products allow users to tag their media with metadata. The metadata may include information about the tagged photo, such as date taken, subjects, or relevant event. For music this may include information about the artist, album or genre of the music. For both photo and music this may include a user "rating" of the data. This metadata is currently useful for searching for a particular photograph or music file, but is typically not used for more advanced selection.

Unlike music files which are often casually listened to, other than occasional printing and sharing with other computer users via electronic mail or photo archives, users have few uses for their digital images. Some users will set a screen saver to display stored digital images and others display stored digital images on external display devices.

These external display devices are becoming less expensive and more common. As the prices of electronic picture frames drop, these devices will become even more commonplace. More advanced sharing applications are also being developed, such as through e-mail or instant messaging. As this happens, users will demand more flexibility in the selection of photographs for display on these devices and for existing and future applications of sharing. Without more advanced techniques for selecting photos, the vast majority of stored digital images sit idly.

Another problem with most currently known techniques of sharing media items is that a user is typically required to take an overt action to access the media items (e.g. open the mail, interact with an IM session, visit a web site). Devices such as the electronic picture frames mentioned above are compelling because the photos are displayed in a more "passive" fashion. However, the electronic picture frames typically hold a small fixed number of photos and display this fixed list of photos until the list is updated.

Accordingly, a solution is needed that improves and develops the concept of selecting a series of media items (photographs) for either sharing or display. The solution should allow specific rules to be developed for determining which media items should be selected and or displayed.

BRIEF SUMMARY OF THE INVENTION

Embodiments of the present invention are directed to a system operating within a computerized environment for selecting and arranging media items as output. The system includes selection components for selecting multiple media items for output. The selection components include a source selection component for selecting media items from at least one source. The system additionally includes a query component for searching media items based on tagged or derived metadata and for selecting the multiple media items based on tagged or derived metadata specified by a user. This tagged metadata might be user specified and defined, or might be pre-defined from templates. The derived metadata might include file attributes such as date created, date modified, or attributes of the content of the file (lightness, darkness), or might be embedded by the device creating the file (e.g. camera picture taken with).

In an additional aspect of the invention, a system operating within a computerized environment is provided for selecting and arranging media items as output. The system includes a source selection component for selecting media items from at least one source. The system also includes weighting tools for causing a first set of selected media items to be selected with a first frequency and a second set of selected media items to be selected with a second frequency.

In yet a further aspect of the invention, a method is provided for operating within a computerized environment for selecting and arranging media items as output. The method includes selecting at least one source for providing media items and formulating a query to search for media items associated with user-selected tagged metadata. The method additionally includes retrieving media items from the at least one selected source having the tagged metadata and organizing the retrieved media items for output.

In yet an additional aspect of the invention, a method is provided for operating within a computerized environment for selecting and arranging media items as output. The method includes selecting at least one source for providing media items and applying weighting tools to the media items for causing a first set of media items to be selected with a first frequency and a second set of media items to be selected with a second frequency. The method additionally includes organizing the selected media items for output.

BRIEF DESCRIPTION OF THE DRAWINGS

The present invention is described in detail below with reference to the attached drawings figures, wherein:

FIG. 3 is a block diagram illustrating a media item list in accordance with an embodiment of the invention;

DETAILED DESCRIPTION OF THE INVENTION

I. System Overview

Figure 1:
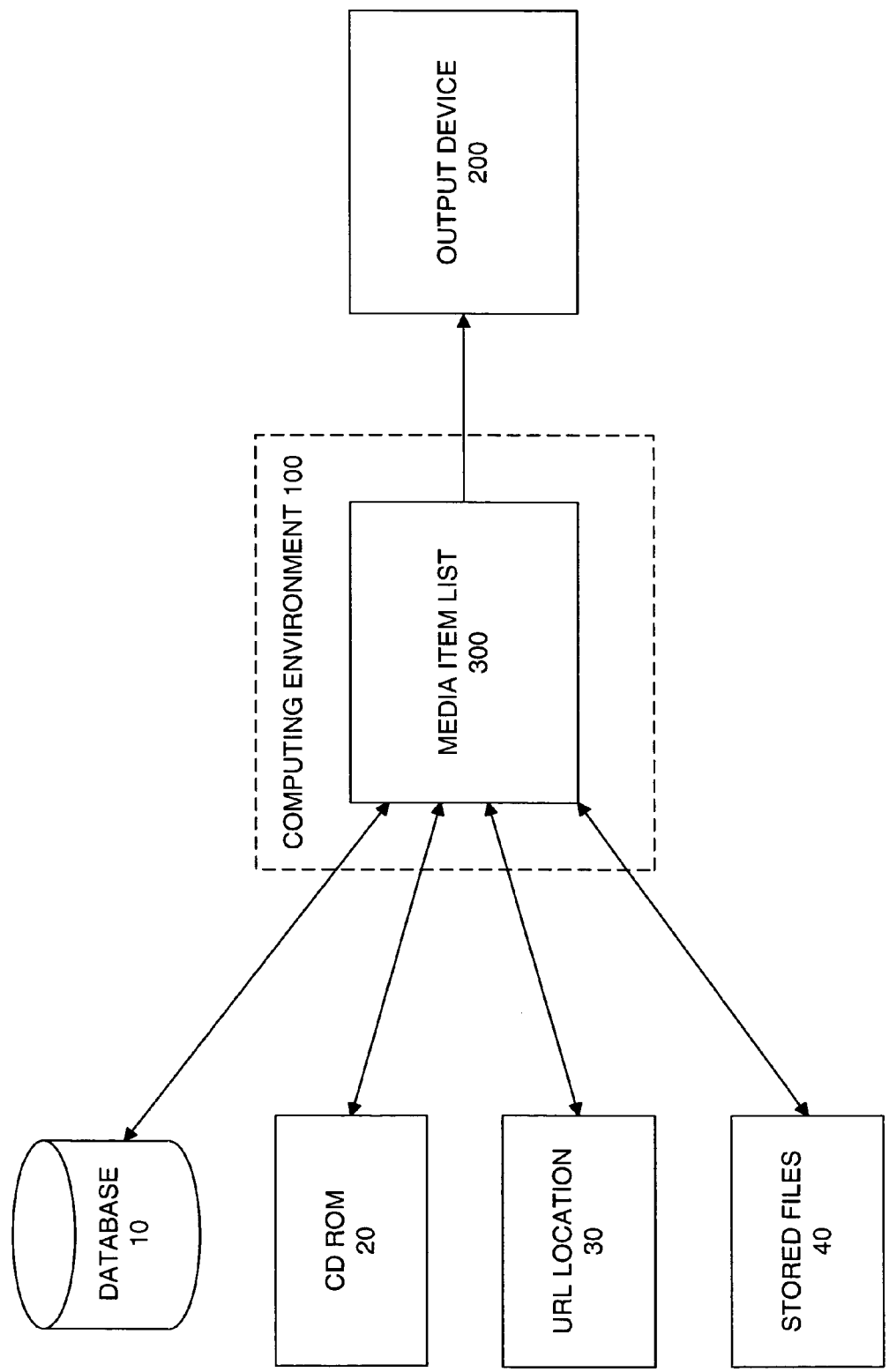
FIG. 1 is a block diagram illustrating an overview of a system in accordance with an embodiment of the invention.

Embodiments of the invention include a method and system for selecting and presenting media items to a user. FIG. 1 is a block diagram illustrating an overview of such a system. A media item list 300 operates within a computing environment 100 to select and present media items to a user. In the displayed embodiment, the media item list 300 extracts media items from a plurality of sources. The sources shown include a database 10, a CD ROM 20, a URL location 30, stored files 40, or any source point at which media items can be stored. Although not explicitly illustrated in FIG. 1, the sources may be local files, network share files, Internet share files, or other types of files. The media item list 300 takes items from the sources selectively and arranges them for output to an output device 200. The particular type of output device 200 depends upon the type of media item selected.

Media items or objects may include music, photographs, videos, or other items taken from a variety of sources. In accordance with embodiments of the invention, media item users are able to select and present media items in a balanced and normalized fashion. The presentation of media items can include printing, sharing, or other presentation modes. In the case of photographs, the items can be used for creating a slide show, displaying in a screen saver, displaying in a dedicated part of the screen, or for displaying on an external device such as a picture frame or hand held display.

II. Exemplary Operating Environment

Figure 2:
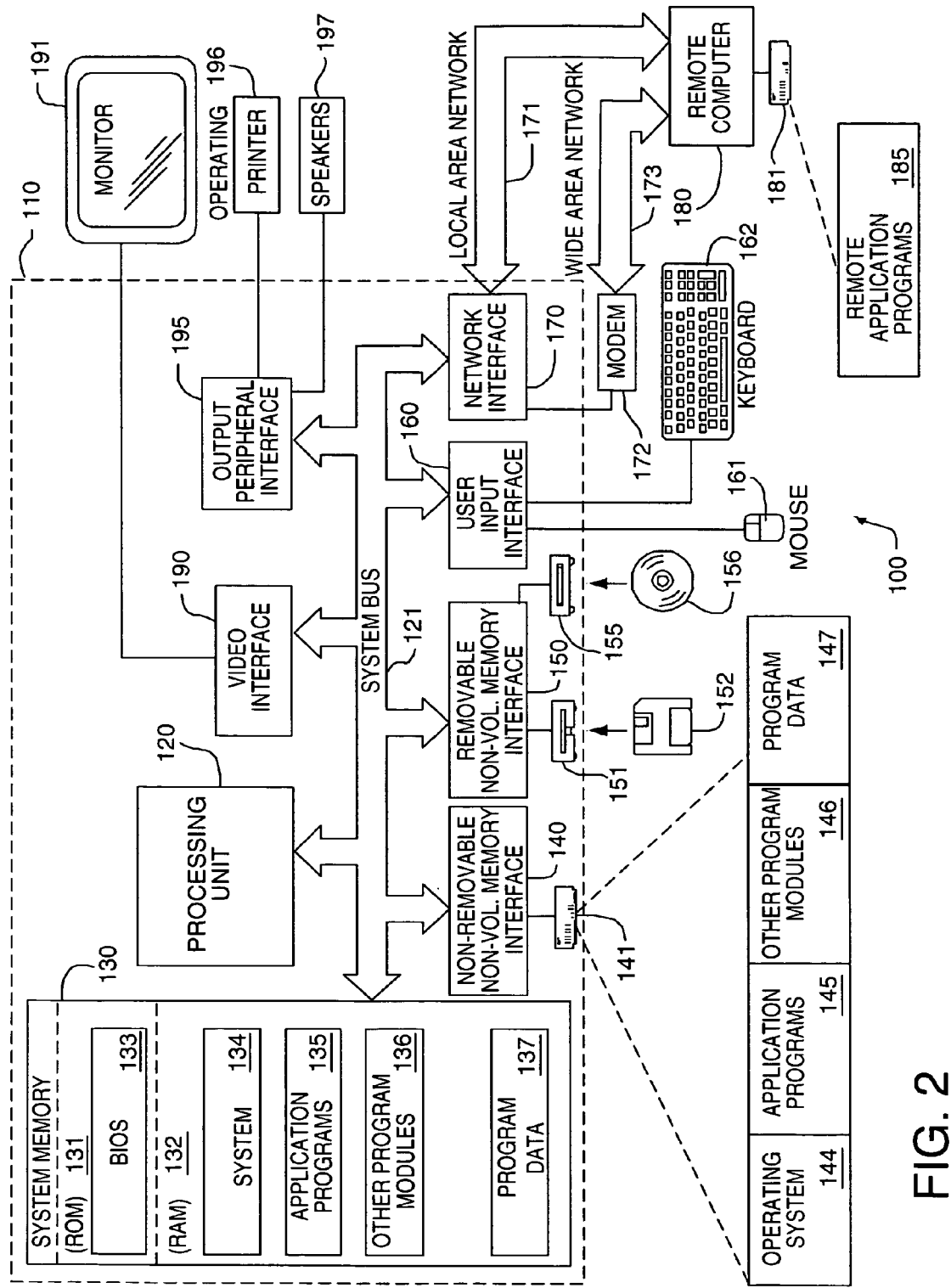
FIG. 2 is a block diagram illustrating a computerized environment in which embodiments of the invention may be implemented.

FIG. 2 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 2, the exemplary system 100 for implementing the invention includes a general purpose-computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

III. Media Item List

FIG. 3 illustrates components of media item list 300 in accordance with an embodiment of the invention. The media item list 300 preferably includes selection components 310 and sorting components 320.

The selection components 310 are the components used for selecting a media item. The selection components 310 may include a source selection component 312, weighting tools 316, a query component 314, and a counting component 318.

The source selection components 312 select a source from a plurality of sources such as those shown in FIG. 1. As set forth above, the sources may include the database 10, CD ROM 20, URL 30, or stored files 40. The stored files 40 may include single stored media items or a directory of stored media items. The source selection components 312 further may select an individual media item from a selected source. The media items could include specific images from a file system, from the Internet in the form a URL, or from any other source. Accordingly, in its simplest form, the media item list entries include a set of discrete items such as images. The source selection components 312 may also access an embedded media item list. The embedded list may be accessed from a file or URL and may contain its own selection components and sorting components for determining how to select and sort media items. The use of an embedded media item list will be further discussed below with relation to commands and implementation examples.

The query component 314 is capable requesting, based on user specified parameters, a particular a media item (or media items) having a particular characteristic (or characteristics) and searching for that characteristic throughout each available source. For instance, if a user wants to select all or some photographs of Jane and Jim, the query component 314 is capable of searching through metadata to locate all photos that include Jane and Jim. Other examples could include photographs of a vacation in Mexico, photographs from a graduation party, photographs taken on a particular date, photographs of a certain color, etc.

The weighting tools 316 are capable determining proportions of selected media items to be displayed. For instance, a viewer may want to see some photographs of the Mexico vacation and some photographs of the graduation party, but the viewer may want to see 75% vacation photos and 25% party photos. The weighting tools 316 ensure that the viewer receives the correct proportions. The proportions are maintained regardless of the number of photos that meet the input criteria. So if 1200 vacation photos are found but 10 party photos, the results would still balance the party photos against the vacation photos. This would either be by select 10 party and 30 vacation photos, by selecting the 1200 vacation photos but repeating the 10 party photos 40 times yielding 400 party photos, or by some balance in the middle.

The counting component 318 determines how many photos to ultimately select from to create the list for the output display. This could be a specific number of photos (e.g. ten) or could be as many photos as the media item list 300 generates. The photos returned may include a number less than the number of specific photos requested. For instance, a requester may ask for ten photos, but only receives five based on the selections made by the aforementioned components. The counting component will indicate if the selected photos list should "repeat" photos to get ten. In the aforementioned case each one would be returned twice. Accordingly, the counting component 318 regulates the number of photos sent to output from each selected source and having each requested type of metadata to reach a requested number.

The sorting components 320 determine how the selected elements in the list should be returned. Sort order could be determined by a random sorting component 322, which is to say that the order could be left to random selection. Alternatively, an identifying data component 324 could determine the sort order be based on name, date taken, date modified, date saved, file size, or any other photo attribute that can be represented as a scalar and sort-able value, such as lightness or darkness. Sort order could also be based on any other of the photo metadata such as tagged keywords. A directional component 326 can determine if the sort is ascending or descending (dark to light or light to dark).

IV. Media Item List Commands

The selection components 310 and sorting components 320 implement their functions through a series of commands. These commands are described herein using photographs as an example of a media item. However, similar commands could be used for other types of media items. Table 1 below provides examples of commands applicable to the media item list 300. These commands may include a "photolist" command, an "imagefile" command, a directory command, and a "photolistfile" command. Furthermore, these commands are further controlled by parameters that include a count parameter, a depth parameter, and a sort command. Each of these commands is further explained below.

TABLE 1

```
<photolist count="*">
    <imagefile>http://domain.com/photo.jpg</imagefile>
    <photolist count="5" sort="random" repeat="0">
        <imagefile>c:\image1.jpg</imagefile>
        <directory count="10" depth="2" sort="random"
repeat="1">c:\foo\</directory>
    </photolist>
    <photolistfile>c:\myfile.plf</photolistfile>
</photolist>
```

An "imagefile" command may be used for source selection and points to a file in a specified location such as on the hard disk or the URL of an image on the Internet. The "imagefile" command will select the image and cause the specifically referenced item to be returned. The item will be output assuming the containing command returns all items for selection or if the containing command constrains the number returned but the item is selected.

A "photolist" command executes an embedded photo list. The "photolist" command may include a count of the number of photos to return from the embedded list once executed. The "photolist" command may also include a repeat command. For the repeat command, a value of "1" may direct the list to repeat photos to reach the specified count if the current count is less than a target count. A "0" value may indicate that the sequence should not be repeated. The "photolist" command may also include a sort command for designating a random sort, a sort by name, a date sort, a size sort, etc. A value of "1" may indicate a descending sort and a value of "0" may indicate an ascending sort.

When an embedded photo list is executed, its rules are applied and the resulting items returned. Once these items are returned, the items are inserted in the larger media list. The following is an example.

TABLE 2

```
<photolist count="1" sort="random">
    <imagefile>http://domain.com/photo.jpg</imagefile>
    <photolist count="1" sort="random" repeat="0">
        <imagefile>c:\image1.jpg</imagefile>
        <imagefile>c:\image2.jpg</imagefile>
        <imagefile>c:\image3.jpg</imagefile>
    </photolist>
</photolist>
```

When the embedded "photolist" from Table 2 is executed, it returns one random file. If the random file is c:\image2jpg, the photo list takes the form of Table 3.

TABLE 3

```
<photolist count="1" sort="random">
    <imagefile>http://domain.com/photo.jpg</imagefile>
    <imagefile>c:\image2.jpg</imagefile>
</photolist>
```

After the embedded list is executed, the "photolist" command selects one of the image files in Table 3 randomly. Fifty percent of the time http://domain.com/photojpg would be selected. The other fifty percent of the time, one of the three files in directory c:\ (in this case image2.jpg) will be selected. In a nutshell, embedded "photolist" commands are executed recursively depth first Table 1 also shows a "photolistfile" command. The command is the similar to the "photolist" command, but the referenced list is an external file. Because a photo list contained in a file has its own root photolist command with parameters, there are no parameters to this command. Instead, the parameters in the embedded list control the number of photos returned. In another embodiment, the commands might be placed with the photolistfile command. In yet another embodiment, the commands in the photlistfile command might override the commands in the embedded file.

A "directory" command is also shown in Table 1. This command returns a list of media items contained in a directory. Subdirectories in a directory element can also be executed recursively to allow normalization to be applied across subdirectories. In certain embodiments, this recursion can be controlled by additional parameters on the directory command. Parameters within a directory command may include a count command, the depth of directories to recurse, the order of the subdirectories to recurse, a file and/or directory mask to include/exclude files, etc. A count command can specify the number of photos to return from the directory/sub-directories. A repeat command may indicate whether or not to repeat photo display if the count is less than the target count. A "1" may be used to order a repeat and a "0" may be used to avoid repeating. A sort command may include random sort, name sort, date sort, and size sort commands. A descending sort and ascending sort command may be available. A directory mask or "DirMask" command may provide a mask for directory recursion (e.g. *, *foo). A "FileMask" command may include a mask for file inclusion (e.g. *.jpg).

A directory command parameter might control if recursion is done, or might control "depth" through which normalization and weighting may be applied. The following Table 4 is a directory structure that might contain images from a photo library:

TABLE 4

```
2003
2003\event1
2003\event2
2003\event3\day1
2003\event3\day2
2003\event3\day3
2003\event4
```

A user may want three media items from each of the events in Table 4. By specifying a count of three and a depth of two, the list will output three photos from each event, at the depth of two on the directory traversal. The specification of count and depth allows the user to normalize directories that are at different depths in the same tree.

The directory command applies the photo list rules (count, sort, repeat) recursively through each subdirectory depth first. Table 5 represents a directory tree.

TABLE 5

```
photos\2003\one.jpg
photos\2003\two.jpg
photos\2003\January\three.jpg
photos\2003\January\four.jpg
```

If count=1, repeat=1, sort=random, dirmask=*, filemask=* and the directory command is executed, another parameter called the "root" parameter dictates the handling of files one.jpg and two.jpg because these are files that exist in a directory with additional subdirectories.

"None" will cause the files to be ignored. "Even" will cause the files to be considered with equal weighting with all the subdirectories. This would be equivalent to taking the files one.jpg and two.jpg and putting them in a subdirectory called "misc" as shown below in Table 6.

TABLE 6

```
photos\2003\misc\one.jpg
photos\2003\misc\two.jpg
photos\2003\January\three.jpg
photos\2003\January\four.jpg
```

Because the algorithm executes depth first, it is first applied to the "misc" subdirectory and one is randomly selected. The algorithm is subsequently applied to the January directory and the algorithm randomly selects one item. If one.jpg is randomly selected from the miscellaneous subdirectory and three.jpg from the January subdirectory, these two elements are returned, and the algorithm applied again. Again, an item, for example three.jpg, is randomly selected. There is a 25% chance of any file being returned.

Returning to Table 5, the media item list would output different elements if the root parameter is "heavy. In contrast to "even", which applied the normalization first, the "heavy" root parameter causes one.jpg and two.jpg be considered before applying a normalization. In this example, there is a 33.3% chance that one.jpg is chosen, 33.3% chance that two.jpg is chosen, a 16.66% chance that three.jpg is chosen overall, and a 16.66% chance that four.jpg is chosen overall. The "depth" parameter simply controls the depth in the tree for applying normalizations.

The following Table 7 illustrates a more complex example.

TABLE 7 photos\2003\January\three.jpg
photos\2003\January\four.jpg
photos\2003\February\five.jpg
photos\2003\March\Week1\six.jpg
photos\2003\March\Week1\seven.jpg
photos\2003\March\Week2\eight.jpg
photos\2003\March\Week2\nine.jpg If a user wants to select one photo from January, February, and March with equal weighting, the user can specify a depth of "3" to tell the system to start applying the filters at the 3rd subdirectory and append the results together to form an overall list. If count is "1" and depth is "3", the system will select one photo from January (each with a 50% chance), one from February (always five.jpg), and ultimately one from March (each with a 25% chance of being selected). The command would return, as an example, three.jpg, five.jpg and eight.jpg. Alternatively, it might return four.jpg, five.jpg, and seven.jpg. In fact, the command might return one of eight different permutations possible as indicated in Table 8.

TABLE 8

Three.jpg, five.jpg, six.jpg
Three, five, seven
Three, five, eight
Three, five, nine
Four, five, six
Four, five seven
Four, five, eight
Four, five, nine Although not shown in Table 5, a group command may also be provided. The group command may point to an online group, online community or Internet based group of files. An example of this is the MSN groups and community system. Online MSN communities are basically directories and follow the same rules as directories. However, a group command would point to a root URL rather than a file path.

Using all of the commands described above as well possible additional commands, the functions of source selection, weighting, queries, counting, and sorting are accomplished to send a plurality of desired media items to the output device 200.

V. Implementation Examples

The components of the media item list 300 utilize the commands described above interact to create a variety of unique scenarios. The following paragraphs illustrate the capabilities of the media item list 300.

In a first implementation example, the media item list 300 may be a photo list including two embedded photo lists. The first embedded photo list might contain one thousand photos and the second embedded photo list may include one hundred photos. The selection components 310 explained above may select two photos from each of the embedded photo lists, resulting in a total of four photos, in order to effectively normalize the number of times that photos from each of the categories would be displayed. In this case, the list with one hundred photos displays the same number of photos as the list of one thousand photos, thereby giving the photos from the smaller list a ten times weighting.

If a user wanted to display one hundred photos from each list, the user could select all one hundred photos from the list of one thousand photos or all one hundred from the list of one hundred. However, a user might also want to display twice as many photos from the list of one hundred than from the list of one thousand. The user could simply select two photos from the list of one hundred and one photo from the list of one thousand.

In another scenario, the user could select one hundred photos from the list of one hundred and fifty photos from the list of one thousand, resulting in a total of one hundred and fifty photos. If a user needed three hundred photos for output, the user could run the algorithm twice using a repeat command, but this might result in the same photos from the larger list being selected each run. Optionally, the user could select two hundred photos from the smaller list and one hundred photos from the larger list. In this scenario, none of the same photos would be sent to output twice. Weighting could be applied in a more specific manner, by having a weight associated with the embedded photo or photo list when randomly selecting photos. This weight would be relative to all other weights in randomly selecting the photo.

In a screensaver application, a user could configure a screen saver to display his favorite photos (for example, photos marked with metadata of "favorites") 10% of the time, to display "timely" seasonal photos (for example, either photos taken around the same time of year or photos for a current holiday and tagged as such) 20% of the time, to display photos that were shared in the last week (for example, photos that the IM and e-mail sharing application put into a specific directory) 30% of the time, photos from a family web site (for example, photos from an online group) 20% of the time, and the remaining time (20%) display random photos from the entire collection. This aforementioned task can be accomplished simply by using the photo list 300 explained above to create output. The user could select ten photos using a query to obtain favorite photos and also select ten random photos. Another query might select twenty photos from a query that returns Christmas photos. A third query might select thirty photos from a share directory where the date shared was less than one week ago. A fourth list element might include selecting twenty photos from a source such as an online community or web site, and the remaining twenty photos may be selected from a collection on the hard drive.

As set forth above, the query component 314 can search for media items based on stored metadata to select a series of media items in an intelligent manner. In the case of photographs, this metadata can be user driven. For instance, the user may tag metadata on the photo. Metadata may include attributes of the photo itself such as date, time, location taken, what camera, or physical location as specified by a directory. Alternatively, metadata could indicate how a photo was acquired. For instance, the user may have taken the photo or may have received it from another user. Different weights can be applied to this metadata for consideration in algorithms to select photos to display. These weights could be user driven. For instance, a user could tag photos as favorites and these photos could receive greater weight. Alternatively, photos taken more recently could be given greater weight.

In another embodiment, a photo list may include an embedded query command. This command may return a list of photos according to an arbitrary query, such a SQL query into a relational database. As discussed above, a query might be based on file attributes, images characteristics, or more likely photo metadata such as tagged key words. An embedded query list element may contain attributes describing the source list, the query, and how many photos to ultimately use from the list. In this regard, the embedded query is similar to the embedded list 350. Sort, repeat, and count features might also be present in the embedded query element.

With all of the features shown in FIG. 3, the media item list 300 can specify a photo output including, for example, ten specific images and ten images selected based on tagged metadata. For instance, a user could select ten photos of sunsets based on tagged metadata and ten photos of the user's girlfriend to output a romantic slideshow. The photos might be specific (ten specific photos of sunsets) or selected at random from thousands (ten random photos from all my sunsets). Using the weighting and query capabilities, a very large number of slideshows can be expressed.

VI. Selection Method

Figure 4:
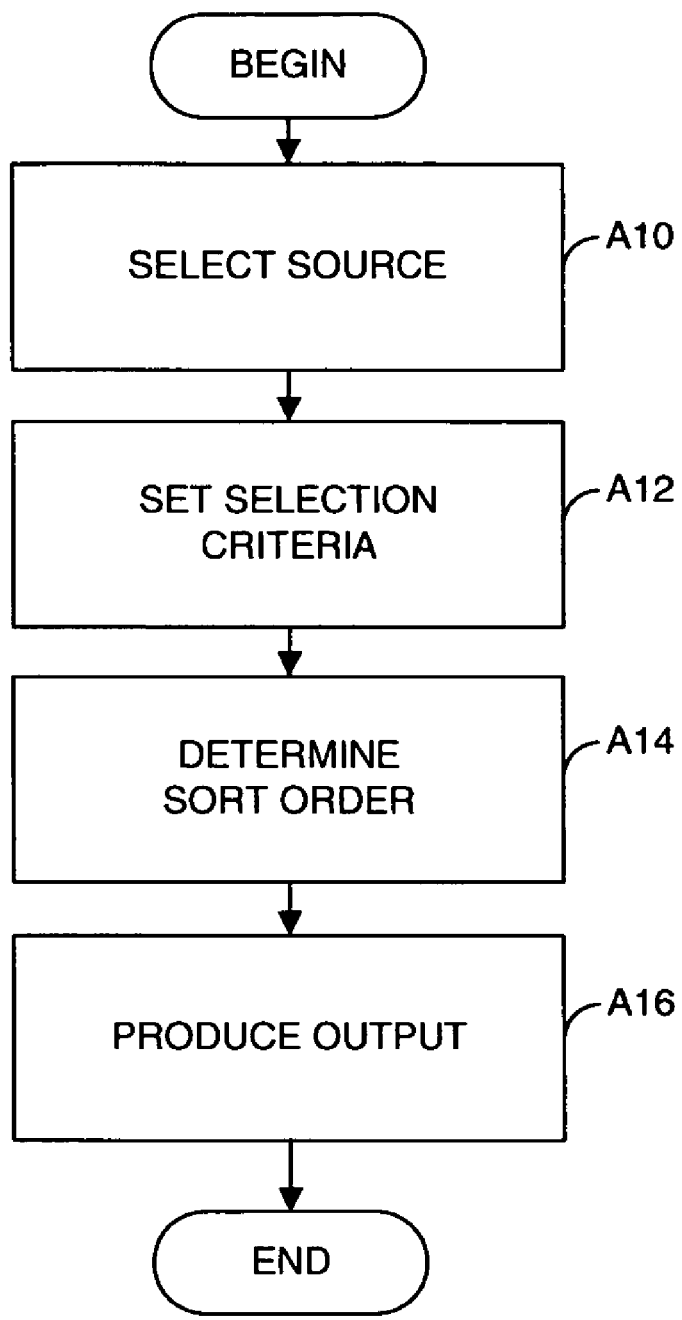
FIG. 4 is a flow chart illustrating a method for producing output from a media item list in accordance with an embodiment of the invention.
Figure 5:
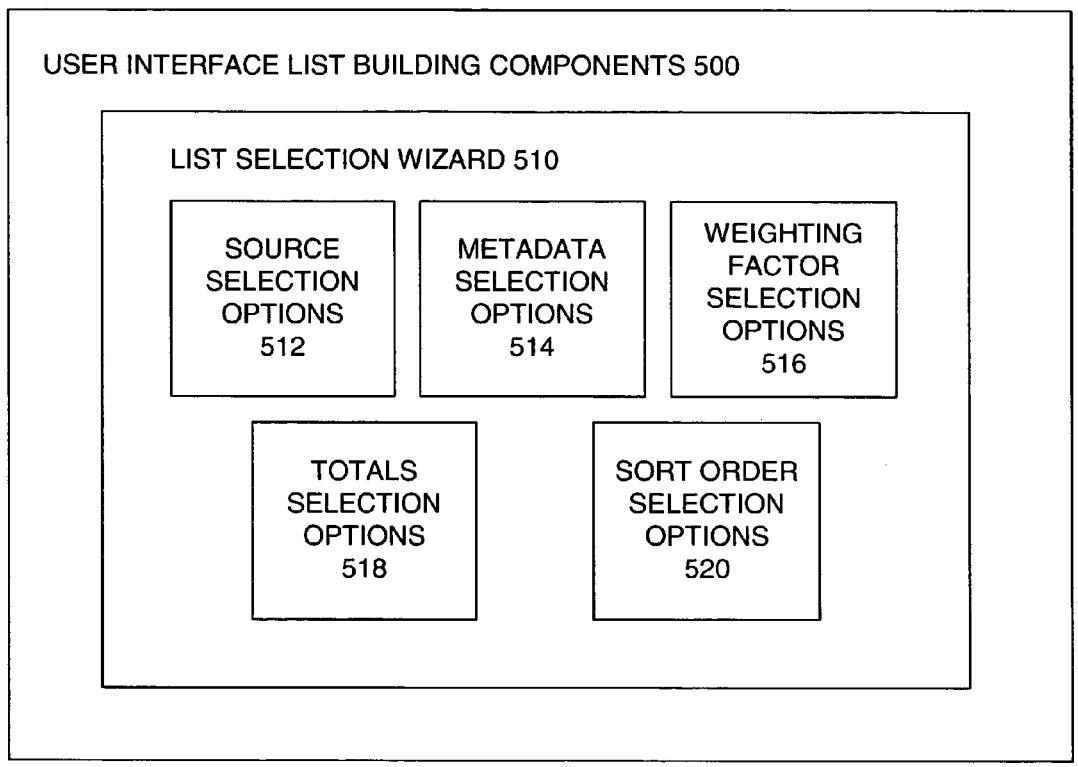
FIG. 5 is a block diagram illustrating a user interface for helping a user to build the media item list.

FIG. 4 illustrates a media item list construction process in accordance with an embodiment of the invention. In step A10, a user would select one or more sources of media items. As set forth above, this source could include an individual media item from a stored file, a URL, a CD-ROM etc. Depending on the type of media item, other sources may also be selected. Commands explained above such as "imagefile" and "directory" can be used for source selection.

In step A12, the user sets selection criteria. The selection criteria can be set using the query component 314, weighting tools 316, and counting component 318. The selection can be made using a query command for locating specific metadata, a root command for weighting some sources more heavily than others, and a count command for determining how many media items to include from a give source. Other commands may also be used to set selection criteria.

In step A14, the user may determine sort order using the sort commands such as random sort, name sort, date sort. The user may also select ascending and descending sorts. Any number of sort criteria may be used and this list is intended to be merely exemplary and not exhaustive.

In step A16, the media item list constructed by the user can be executed to provide output in the form of media items. The output of media items using the media item list can happen at any time an application desires. Timing could be on demand and user driven. Renewal may occur whenever a list is exhausted or at pre-scheduled intervals.

VII. User Interface

In order to implement the media item list described above, a user may be presented with a series of user interface list building components 500. The list building components 500 may be contained within a list selection wizard 510 that presents options to a user. The list selection wizard 510 may provide a user with a series of source selection options 512 for providing an available list of sources in which accessible media items may be contained. In embodiments of the invention, the user will be able to add sources as the sources are created. The list selection wizard 514 may also provide metadata selection options 514. The metadata selection options 514 may include tags applied by the user, dates, names, etc. The weighting factor selection options 516 may present a user with weighting options after the user has selected a source of media items. Totals selection options 518 may be provided to the user in order to allow the user to select a total number of media items to be output. Finally, sort order selection options 520 may be provided to the user to allow the user to determine an output order. These user interface components are merely exemplary.

VIII. Conclusion

The above-described media item list has many potential applications. The media item list may have operating system (OS) level functionality. In this regard, the media item list might apply to photo integration with the OS. The media item list may also be implemented in conjunction with photo organizational products that manage global lists of images. These products "categorize" images with metadata and the media item list provides functionality for the categorization. The media item list may also be implemented in conjunction with any photo sharing product in order to exert granular control over shared media items. It may apply to other media types (e.g. music) that are similarly organized in tools, the operating system, and ultimately selected for use, in this case playback vs. display.

The media item list allows for future extensibility. By defining new list element types, new rules can be built and applied as necessary. A command to apply a weighting factor on a logarithmic scale may be based on how recently the photo was shared. Thus, photos shared less then one week ago are very likely to show up, photos within three weeks somewhat likely, within ten weeks somewhat unlikely, and older than that very unlikely to be selected. By building this extensibility into the system, a wide variety of rules and algorithms can be expressed simply by building these photo lists.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. A system embodied on one or more computer-readable storage media and operating within a computerized environment for selecting and arranging multiple, individual media items as output, the system comprising:

selection components for selecting multiple, individual media items for output based on user-specified rules, the selection components comprising:

a query component for selecting a first set of individual media items from at least one source based on at least one first user-specified characteristic and a second set of individual media items from at least one source based on at least one second user-specified characteristic, wherein the first set of individual media items is associated with a first type of metadata and the second set of individual media items is associated with a second type of metadata, and weighting tools for causing the first set of individual media items to be selected with a first user-specified frequency and the second set of individual media items to be selected with a second user-specified frequency, wherein the first set of individual media items and the second set of individual media items provide a plurality of individual media items for output; and at least one output sorting component for arranging the plurality of individual media items together for output, including determining a sort order for the plurality of individual media items, wherein the at least one output sorting component comprises at least one of: an identifying data component for determining a sort order based on metadata; a random component for designating a random sort order; and a directional component for specifying one of a descending and ascending sort order.

2. The system of claim 1, wherein the first set of individual media items is disposed within a first location and the second set of individual media items is disposed within a second location.

3. A system embodied on one or more computer-readable storage media and operating within a computerized environment for selecting and arranging multiple, individual media items as output, the system comprising:

selection components for selecting multiple, individual media items for output based on user-specified rules, the selection components comprising;

a source selection component for selecting individual, media items from at least one user-specified source, and weighting tools for causing a first set of individual media items to be selected with a first user-specified frequency and a second set of individual media items to be selected with a second user-specified frequency, wherein the first set of individual media items and the second set of individual media items provide a plurality of individual media items for output, and wherein the first set of individual media items is associated with a first type of metadata and the second set of individual media items is associated with a second type of metadata; and at least one output sorting component for arranging the plurality of individual media items together for output, including determining a sort order for the plurality of individual media items, wherein the at least one output sorting component comprises at least one of: an identifying data component for determining a sort order based on metadata: a random component for designating a random sort order: and a directional component for specifying one of a descending and ascending sort order.

4. The system of claim 3, wherein the first set and the second set are each stored in distinct locations within a directory.

5. The system of claim 3, further comprising a query component for searching media items from at least one selected source based on tagged metadata and for selecting the multiple media items based on tagged metadata specified by a user.

6. A method operating within a computerized environment for selecting and arranging media items as output, the method comprising:

receiving user-specified rules for selecting and arranging media items as output, the user-specified rules specifying at least one source for, providing media items and weighting for causing a first set of media items to be selected with a first frequency and a second set of media items to be selected with a second frequency;

retrieving media items from the at least one source by selecting the first set of media items at the first frequency and selecting the second set of media items at the second frequency based on the user-specified rules, wherein the first set of individual media items is associated with a first type of metadata and the second set of individual media items is associated with a second type of metadata; and organizing the selected media items for output by determining a sort order of the selected media items, wherein determining the sort order comprises at least one of the following: determining a sort order based on tagged metadata: selecting a random sort order; and designating one of an ascending and a descending sort order.

7. The method of claim 6, further comprising formulating a query to search for media items associated with user-selected tagged metadata from the at least one selected source and retrieving the media items from the at least one selected source having the tagged metadata.

8. The method of claim 6, wherein the first set of media items is stored in a first location and the second set of media items is stored in a second location.

9. The method of claim 6, further comprising selecting and executing an embedded list.

10. One or more computer-readable storage media embodying computer useable instructions for performing a method for selecting and arranging media items as output, the method comprising:

receiving user-specified rules for selecting and arranging media items as output, the user-specified rules specifying at least one source for providing media items and weighting for causing a first set of media items to be selected with a first frequency and a second set of media items to be selected with a second frequency;

retrieving media items from the at least one source by selecting the first set of media items at the first frequency and selecting the second set of media items at the second frequency based on the user-specified rules, wherein the first set of individual media items is associated with a first type of metadata and the second set of individual media items is associated with a second type of metadata; and organizing the selected media items for output by determining a sort order of the selected media items, wherein determining the sort order comprises at least one of the following: determining a sort order based on tagged metadata; selecting a random sort order; and designating one of an ascending and a descending sort order.

11. The one or more computer-readable storage media of claim 10, wherein the first set of media items is stored in a first location and the second set of media items is stored in a second location.

12. The one or more computer-readable storage media of claim 10, wherein the method further comprises selecting and executing an embedded list.

The Examiner's amendment has been made in order to place the application in a condition for allowance.

* * * * *